United States Patent
Jaffers et al.

(10) Patent No.: US 7,484,310 B2
(45) Date of Patent: Feb. 3, 2009

(54) CLAMP ASSEMBLY

(75) Inventors: Kenneth Geoffrey Jaffers, Aitkenvale (AU); Peter Leonard Stevens, Aitkenvale (AU)

(73) Assignee: Frook Pty Ltd, Queensland (AU)

( * ) Notice: Subject to any disclaimer, the term of this patent is extended or adjusted under 35 U.S.C. 154(b) by 0 days.

(21) Appl. No.: 11/587,491

(22) PCT Filed: Apr. 28, 2005

(86) PCT No.: PCT/AU2005/000605

§ 371 (c)(1),
(2), (4) Date: Oct. 26, 2006

(87) PCT Pub. No.: WO2005/111341

PCT Pub. Date: Nov. 24, 2005

(65) Prior Publication Data

US 2007/0216078 A1    Sep. 20, 2007

(30) Foreign Application Priority Data

May 19, 2004 (AU) .............................. 2004902646
Aug. 9, 2004 (AU) .............................. 2004203635

(51) Int. Cl.
*E04G 21/18* (2006.01)

(52) U.S. Cl. .............................. 33/613; 269/6; 269/143; 269/910

(58) Field of Classification Search .................. 33/194, 33/404, 613, 645; 248/229.12, 229.15, 229.22, 248/229.25; 269/3, 6, 37, 40, 43, 44, 45, 269/143, 149, 249, 910

See application file for complete search history.

(56) References Cited

U.S. PATENT DOCUMENTS

| 1,004,743 | A | * | 10/1911 | Cobb | 269/149 |
|---|---|---|---|---|---|
| 1,354,378 | A | * | 9/1920 | Carpenter | 269/149 |
| 1,405,113 | A | * | 1/1922 | Gwinn | 254/43 |
| 1,583,611 | A | * | 5/1926 | Seely | 269/146 |
| 2,686,959 | A | * | 8/1954 | Robinson | 33/613 |
| 2,778,393 | A | * | 1/1957 | Golasowski | 269/63 |
| 3,423,082 | A | * | 1/1969 | Reyner | 269/104 |
| 3,883,128 | A | * | 5/1975 | Breese | 269/45 |
| 4,322,064 | A | * | 3/1982 | Jarvis | 269/43 |
| 4,420,921 | A | * | 12/1983 | Hardin | 52/749.1 |
| 4,704,829 | A | * | 11/1987 | Baumker, Jr. | 52/127.2 |
| 5,033,902 | A | * | 7/1991 | Lechner | 403/254 |
| 5,190,266 | A | * | 3/1993 | Barrera | 254/17 |
| 5,490,334 | A |   | 2/1996 | Payne | 33/613 |
| 5,884,411 | A | * | 3/1999 | Raber | 33/613 |
| 6,089,556 | A | * | 7/2000 | Whiteford | 269/149 |

(Continued)

FOREIGN PATENT DOCUMENTS

DE    10233260 A1 *  5/2003

(Continued)

*Primary Examiner*—R. A. Smith
(74) *Attorney, Agent, or Firm*—Hoffman, Wasson & Gitler

(57) ABSTRACT

A clamping device particularly for use in the preliminary stages of the erection of roof trusses, the clamping device comprising a first attachment means (11) to enable the device to be securely and releasably attached to one truss, a second attachment means (20) to enable the device to be attached to an adjacent device or a truss, and means (13) to enable the length between the first attachment means and the second attachment means to be varied.

8 Claims, 8 Drawing Sheets

U.S. PATENT DOCUMENTS

| | | | |
|---|---|---|---|
| 6,393,794 B1 * | 5/2002 | Pellock | 52/696 |
| 6,530,565 B1 * | 3/2003 | Simpson | 269/6 |
| 6,688,569 B1 * | 2/2004 | Weiss | 248/229.15 |
| 7,114,715 B1 * | 10/2006 | Kirk | 269/147 |
| 7,152,338 B2 * | 12/2006 | Thompson et al. | 33/613 |
| 7,273,210 B2 * | 9/2007 | Thurston et al. | 269/37 |
| 7,377,048 B2 * | 5/2008 | Koetter | 33/613 |
| 2007/0119067 A1 * | 5/2007 | Mackey | 33/613 |

FOREIGN PATENT DOCUMENTS

| | | | |
|---|---|---|---|
| JP | 10061136 A | * | 3/1998 |
| JP | 10227069 A | * | 8/1998 |
| WO | WO 8302794 A1 | * | 8/1983 |
| WO | WO 2008/034165 A1 | * | 3/2008 |

* cited by examiner

CLAMP ASSEMBLY

FIELD OF THE INVENTION

This invention is directed to a clamp assembly and is particularly directed to a clamp assembly for use in the preliminary stages in the erection of roof trusses in domestic and commercial buildings. The invention will be described with reference to this use but no particular limitation is meant thereby, and the clamp assembly may also be applicable to support other types of members.

BACKGROUND ART

During the construction of a building roof, it is very common for roof trusses to be used. A roof truss is typically made of timber (although metal roof trusses are also known) and comprises a number of lengths of timber or metal which are attached together to form the truss. A roof truss can be made to any suitable length and this will typically be between 4-10 meters. The roof truss can also be made to any suitable height and this can be between 1-4 meters. These roof trusses are placed in a side-by-side and spaced relationship relative to each other. Battens are then attached to the trusses and cross braces are used to provide a rigid structure onto which tiles or metal sheets or other types of roof covering members can be attached. The spacing between roof trusses can vary depending on the type of roof covering that will be used, the wind loading, the size of the truss and the like. The spacing between roof trusses will typically be between 0.5-2 meters. Thus, it can be seen that a typical building will have a multiplicity of roof trusses and a typical domestic dwelling can have anywhere between 10-100 roof trusses and commercial dwellings can have even more.

It is important to ensure that the roof trusses are spaced apart by the correct distance in order to comply with local government requirements, wind loading requirements, the weight of roof tiles and the like. If the roof trusses are spaced too close together, too many trusses will be used which will increase the building cost and if the roof trusses are spaced too far apart, the roof strength may be compromised.

The design of the roof truss is such that when the roof truss is placed in an upright manner on top of the building, the truss will tip over unless it is supported prior to attachment of the battens and the cross bracing. Conventionally, the required number of roof trusses are lifted on top of the roof by a crane. A carpenter can then lift up one roof truss to the vertical position and will nail one end of a small measured wooden length to the roof truss. The next roof truss is then lifted into the vertical position and the other end of the length is nailed to the roof truss to hold the two roof trusses together. This procedure is then repeated with any required number of wooden lengths until all the trusses are in the vertical position. Then the battens are nailed or otherwise attached to the trusses and cross braces are attached to hold everything in position.

There are many disadvantages with the conventional method to hold the roof battens in position during the preliminary stages. One disadvantage is that the small wooden lengths are quite thin and are usually nailed by a single nail into each truss to hold the trusses together temporarily. For larger trusses, this attachment is quite insecure. Should a truss become dislodged, it can tip against an adjacent truss and it is possible for all the trusses to collapse in a domino-type fashion. This can cause injury to the carpenter on the roof. This person could accidentally push against a truss and dislodge the truss. Also, the carpenter needs to precut the required number of lengths of wood which will form the spacers and the temporary attachment between the trusses to ensure that the trusses are held apart by the necessary distance. As mentioned previously, the spacing between trusses can vary depending on the size of the truss and other factors. Therefore, the carpenter generally needs to precut the wooden lengths on-site depending on the type of truss that is to be used. This is time-consuming and generally unsatisfactory.

Another disadvantage, and particularly a safety disadvantage is that the above conventional system results in a number of individual (typically wooden) lengths being nailed or otherwise temporarily attached to the truss. With this system, it is possible to break or accidentally removed one length. This can result in collapse of the truss. Therefore, there would be an advantage if a system could be developed that could prevent a temporary brace from being accidentally removed in midsection that can lead to a serious accident.

Various attempts have been made to develop tools for roof trusses and the like. Most of these however, are designed to space frame members apart and not really to temporarily hold or brace two frame members together. Some of these tools are length adjustable. Many of these suffer from two main disadvantages. The first disadvantage is that the tool does not really clampingly engage with a particular truss and is therefore more easy to accidentally remove. For instance, U.S. Pat. No. 5,490,334 describes a tool which can hold a stud/rafter, but this is done using a wedging action, and not a clamping action. Thus, it is possible to knock out the tool. A second main disadvantage is that the tool really functions only to hold two trusses in position and there is no real mechanism to enable a large number of trusses to be temporarily braced in a safe and relatively simple manner. As an example, a truss holding tool is described in U.S. Pat. No. 4,704,209. This tool is designed only to hold a pair of trusses, and therefore if it is necessary to hold more than a pair of trusses, it is necessary to use a number of these tools. However, each tool works independently from each other tool which means that if one tool is inadvertently removed, the trusses can collapse. Therefore, there would be an advantage if it were possible to develop a clamping assembly where a plurality of clamping tools could be preferably held to each other, as opposed to separately, to define a "string" or "chain" of clamping tools. This would make it difficult to inadvertently remove an intermediate tool that can cause collapse of the trusses. To explain, it is much safer to remove the tools from one end truss and working along each other truss as opposed to removing the tools from a position intermediate the ends.

Therefore, there would be an advantage if there was a different way by which trusses could be held in place during the preliminary stages of the erection of the trusses and which would be safer with less chance of the trusses becoming dislodged, and possibly which would enable the various spacing between the trusses to be accommodated.

It will be clearly understood that, if a prior art publication is referred to herein, this reference does not constitute an admission that the publication forms part of the common general knowledge in the art in Australia or in any other country.

OBJECT OF THE INVENTION

It is an object of the invention to provide a device which may overcome at least some of the abovementioned disadvantages or provide a useful or commercial choice.

In one form, the invention resides in a clamping device particularly for use in the preliminary stages of the erection of trusses in domestic and commercial buildings, the clamping device comprising a first attachment means to enable the device to be securely and releasably attached to one truss, a second attachment means to enable the device to be attached to an adjacent device or a truss, and means to enable the length between the first attachment means and the second attachment means to be varied.

This device can be used instead of smaller lengths of wood to hold the trusses securely relative to each other while the battens and cross bracing is attached. Afterwards, the device or devices can be removed and reused.

The first attachment means preferably comprises a clamping means. The clamping means may comprise a pair of jaw members that can attach to a truss. Suitably, one jaw member is fixed and the other jaw member is movable towards and away from the fixed member. The clamping means may comprise an F clamp which is known.

The second attachment means preferably comprises a hook or other similar type of engagement member. The second attachment means need not comprise a clamping means. Instead, it is preferred that the second attachment means can hook to or otherwise releasably engage to an adjacent second clamping device.

To enable such engagement to be achieved in a convenient manner, it is preferred that the clamping device contains an opening or other type of means to enable the second attachment means of one clamping device to hook to or otherwise engage with a second clamping device. Suitably, the opening or other type of means is adjacent the first attachment means.

The second attachment means preferably includes or comprises a swivel-type arrangement to enable the second attachment means to swivel about a longitudinal axis of the clamping device.

The means to enable the length between the first attachment means and the second attachment means to be varied may comprise a length adjustable assembly. The length adjustable assembly may comprise a first elongate member which is attached to or operatively associated with the first attachment means and a second elongate member which is attached to or operatively associated with the second attachment means, and means to move the first elongate member relative to the second elongate member thereby causing the length between the first attachment means and the second attachment means to be extended or retracted. Typically, one of the elongate members contains or is operatively associated with a threaded nut and the other of the elongate members contains or is operatively associated with a threaded rod. The threaded rod will typically extend through the nut and rotation of the threaded rod will cause lengthening or shortening of the clamping device.

In another form, the invention resides in a method of holding roof trusses in position, the method comprising using a first clamping device as described above, positioning the first attachment means of the first clamping device onto a first truss, positioning a second clamping device as described above such that the first attachment means of the second clamping device is attached to a second truss, and the second attachment means of the second clamping device is attached to the first clamping device and preferably to the first attachment means.

An embodiment of this form of the invention is illustrated in FIG. 9.

BRIEF DESCRIPTION OF THE DRAWINGS

Embodiments of the invention will be described with reference to the following drawings in which.

BEST MODE

Referring initially to FIGS. 1-5, this illustrates a particularly preferred embodiment of the clamping device, although the invention is not to be limited only to this particularly preferred embodiment.

Figure 1:
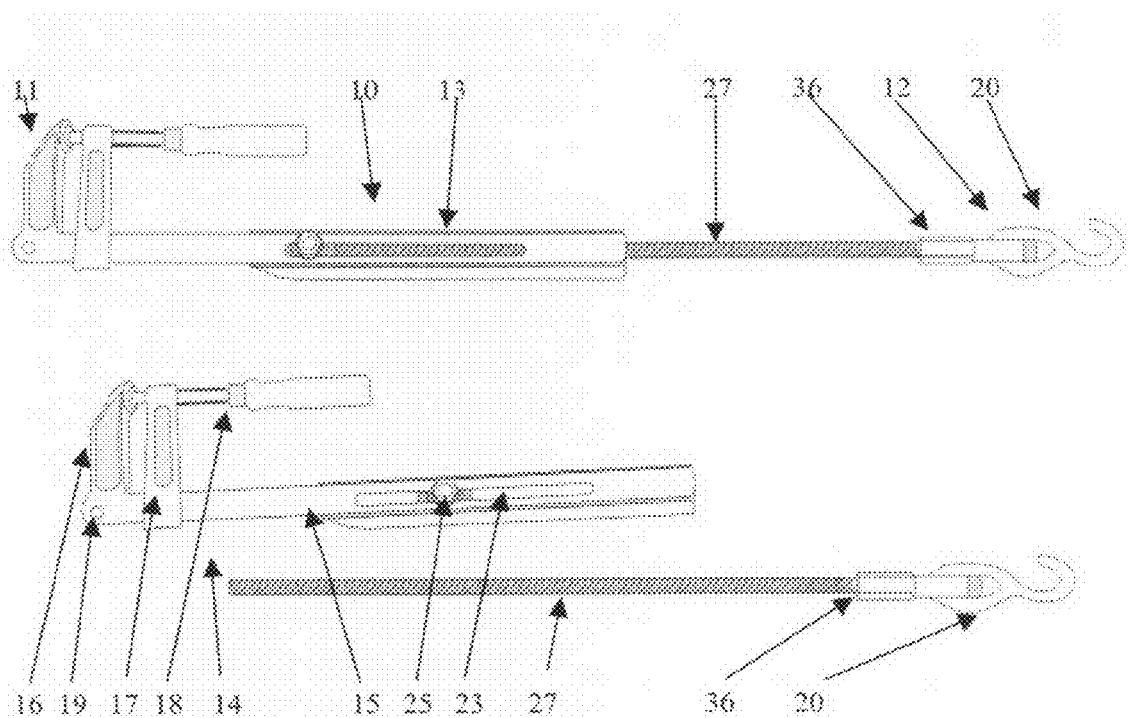
FIG. 1 illustrates two identical clamping devices from one side.
Figure 2:
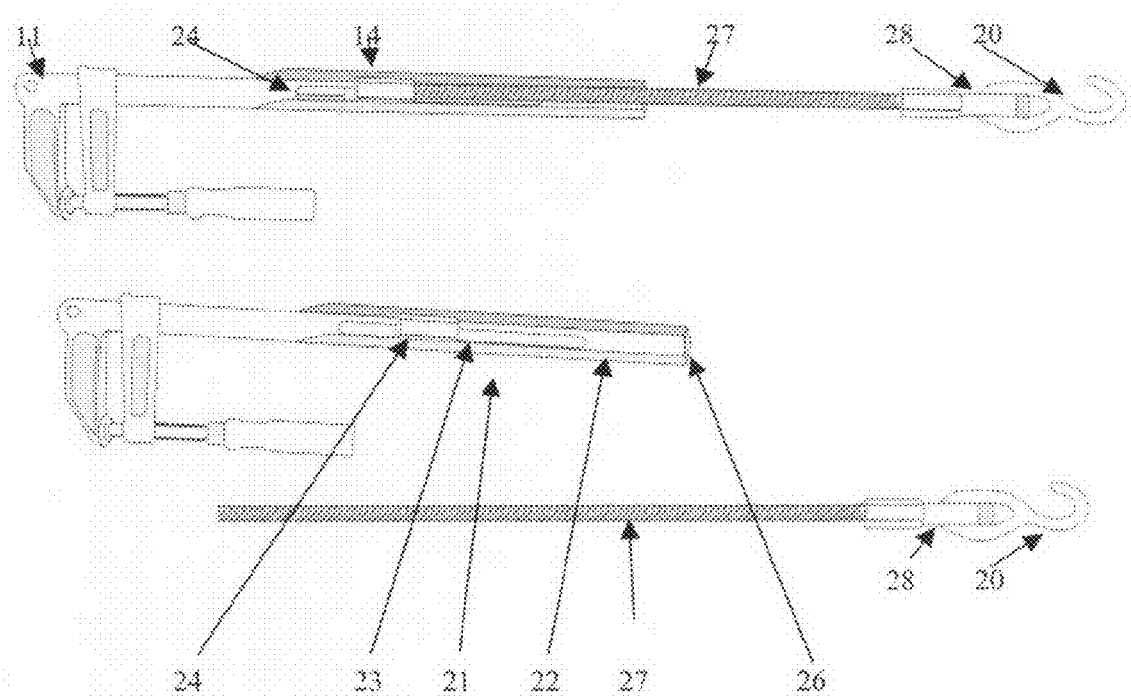
FIG. 2 illustrates the two identical clamping devices of FIG. 1 from the other side.
Figure 3:
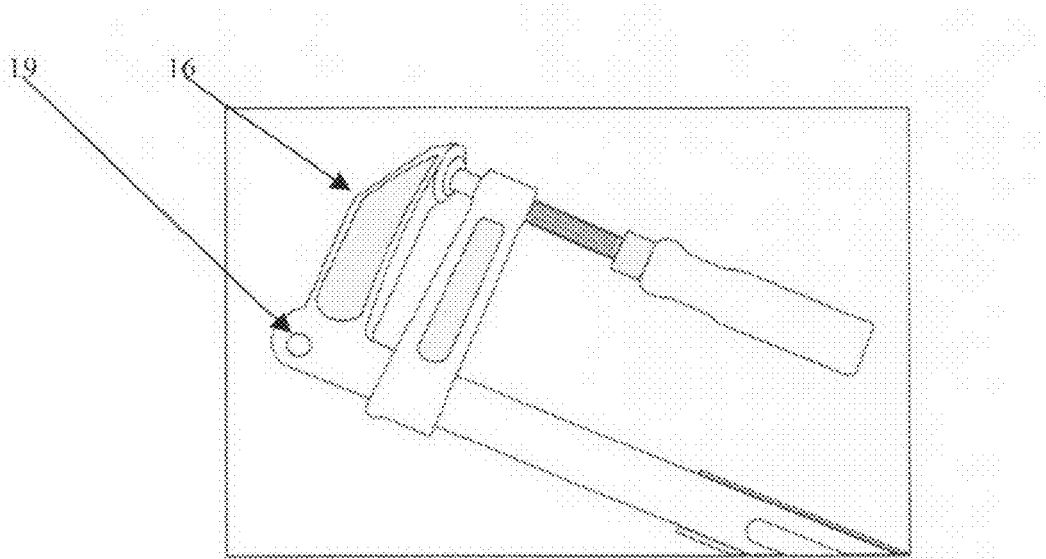
FIG. 3 illustrates a close-up view of the first attachment means.
Figure 4:
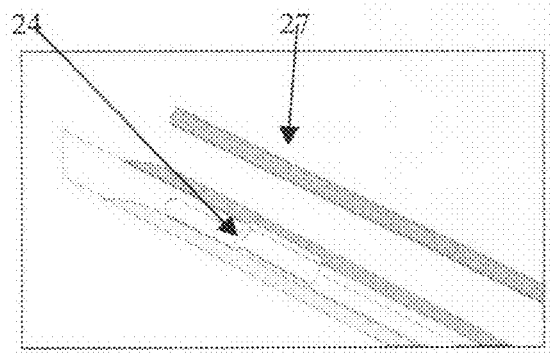
FIG. 4 illustrates a close-up view of part of the length adjustment means.
Figure 5:
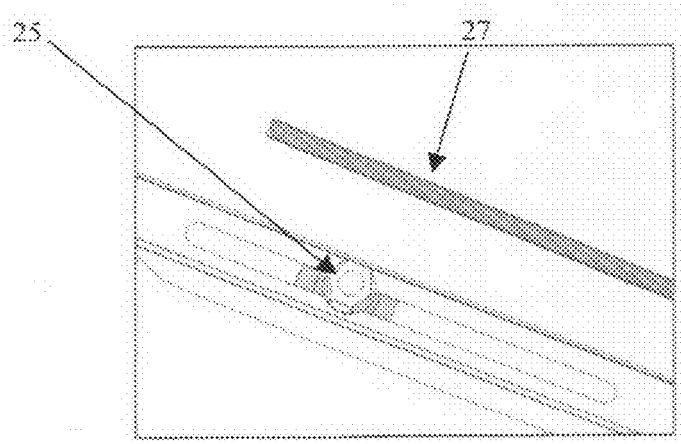
FIG. 5 illustrates a close-up view of FIG. 4 from the other side.

FIGS. 1-5 illustrate a clamping device 10 which comprises a first attachment means 11, a second attachment means 12, and a means to enable the length between the first attachment means and the second attachment means to be varied (otherwise known as a length adjustment means) 13. Referring now in greater detail to the clamping device, the device is made of metal and basically comprises two parts that can be removed from each other. The first part contains the first attachment means 11 and the second part contains the second attachment means 12 and the first part and the second part can be adjusted to increase or decrease the length between the first attachment means 11 and the second attachment means 12. The first part 14 is best illustrated in FIG. 1 and FIG. 2 and comprises an elongate metal stem 15. One end of stem 15 contains the first attachment means in the form of a pair of jaw members comprising a stationary jaw member 16 and a movable jaw member 17. Movable jaw member 17 can move along stem 15 in a manner which is known in the art. Moreover, movable jaw member 17 is provided with a threaded clamping attachment 18 which is also known in the art, and this type of clamp is often known as an "F" clamp.

Jaw member 16 is provided with a small opening 19, the reason for which will be described in greater detail below but basically allows the hook 20 of a second clamping device to be attached through this opening to link the two clamping devices together.

Stem 15 contains a channel portion 21 which is best illustrated in FIG. 2, and the channel portion is a substantially U-shaped channel. The base wall 22 of channel portion 21 contains an elongate slot 23 to assist in the degree of length adjustment that can be made and this will be described in greater detail below.

A threaded nut 24 sits within channel portion 21 but can slide along the channel portion. Nut 24 can be held in position by a second smaller nut 25 which is best illustrated in FIG. 1. Thus, nut 24 can slide along the channel portion from one end of the elongate slot 23 to the other end of the elongate slot 23, but can be clamped to the channel portion by tightening of nut 25.

The lower end 26 of channel portion 21 is closed off but contains an opening (not illustrated) through which a threaded rod 27 can pass.

The second part of the clamping device comprises the threaded rod 27 which can have a length of between 20 centimeters up to three meters and a diameter of between five millimeters up to 30 millimeters although no particular limitation is meant thereby. The threaded rod 27 can either be threaded entirely along its length, or can be threaded along a sufficient part of the length to enable length adjustment to take place.

Rod 27 passes through the opening (not illustrated) in the lower end 26 of channel portion 21 and then is threadingly engaged to nut 24. Rotation of rod 27 in one direction will shorten the length of the entire clamping device 10 while rotation of rod 27 in the other direction will increase the length of the entire clamping device 10. Moreover, to provide further length adjustment, nut 24 can slide from one end of the elongate slot 23 (see for instance the top clamping FIG. 1) to the other end of the elongate slot (not illustrated).

The other end of rod 27 contains the second attachment means 12 which in this particular embodiment comprises a hook 20. Hook 20 is mounted to a swivel 28 to enable the hook to rotate about the longitudinal axis of rod 27.

Figure 6:
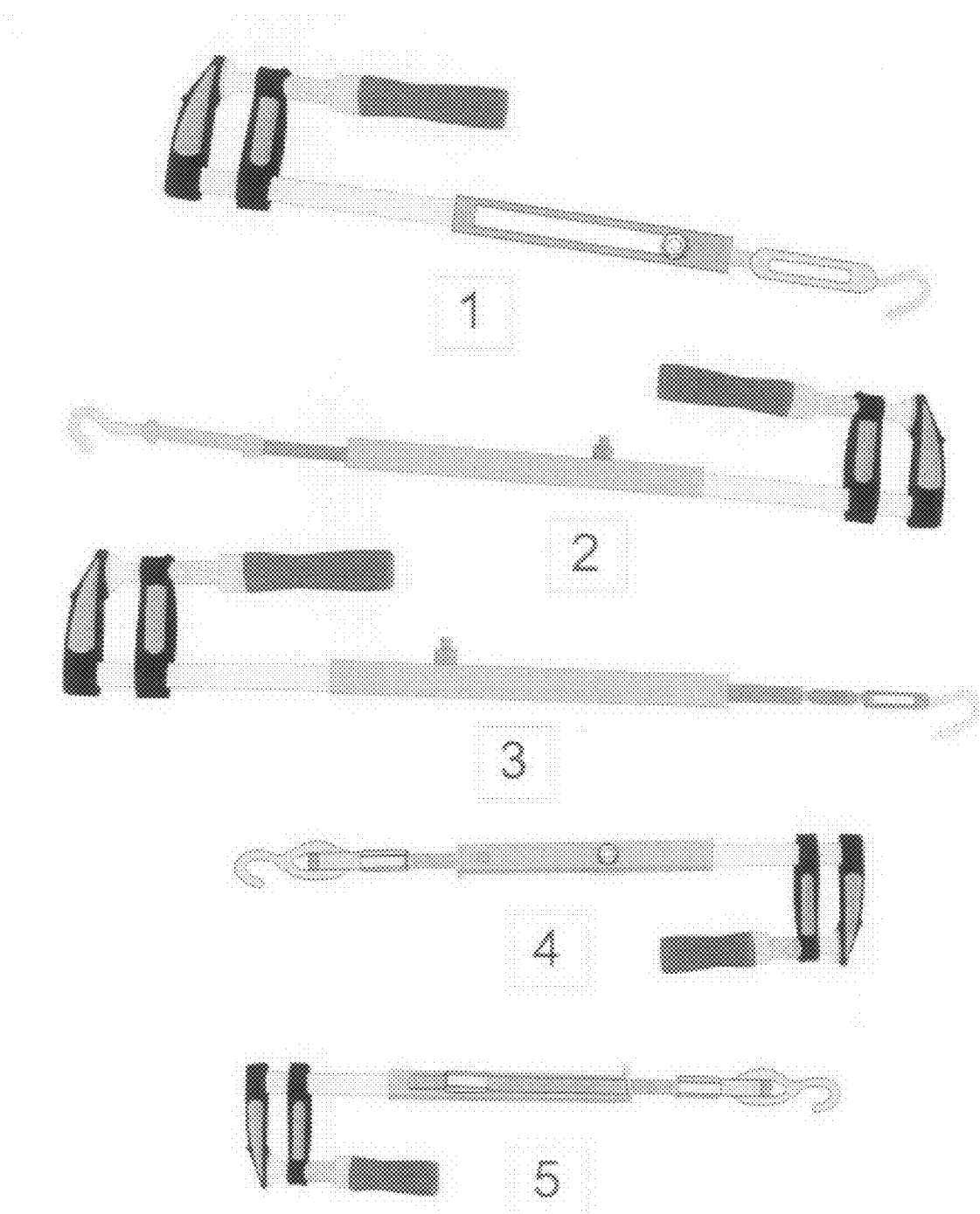
FIG. 6 illustrates 5 different embodiments of the clamping device.
Figure 8:
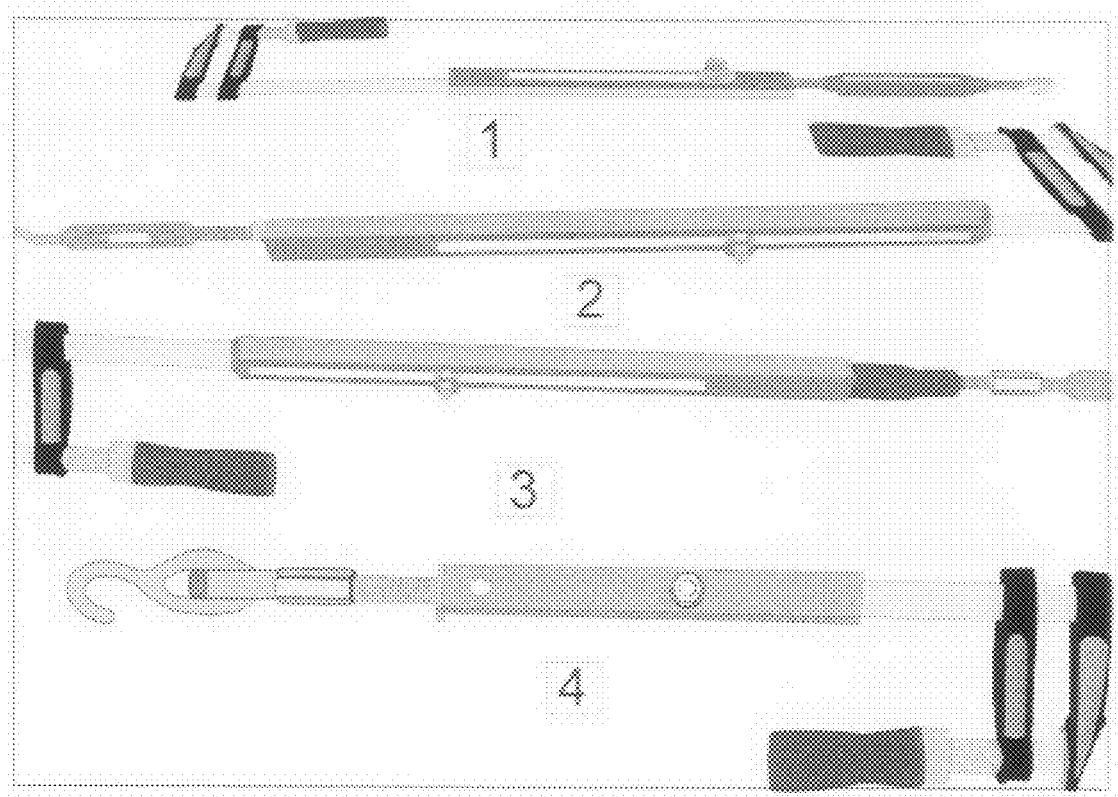
FIG. 8 illustrates a different view of some embodiments of the clamping device.

FIG. 6 illustrates variations to the clamping device to show that the invention is not to be limited only to the clamping device illustrated in FIGS. 1-5. FIG. 8 also illustrates some of the clamping devices of FIG. 6 from a different angle. For ease of description, these clamping devices have been numbered 1-5 in FIG. 6 and the first four of these clamping devices are illustrated as well in FIG. 8.

Briefly, each of the variations illustrated in FIG. 6 and FIG. 8 contains the "F" clamp arrangement described above but have variations in the type of second attachment means, and the length adjustment means.

Figure 7:
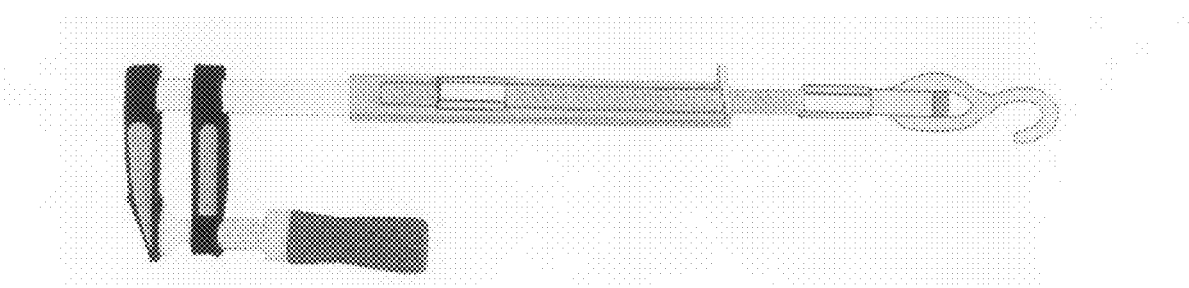
FIG. 7 illustrates a close-up view of the fifth embodiment of the clamping device.

FIG. 7 illustrates a view of variation 5 which is also illustrated in FIG. 6.

Figure 9:
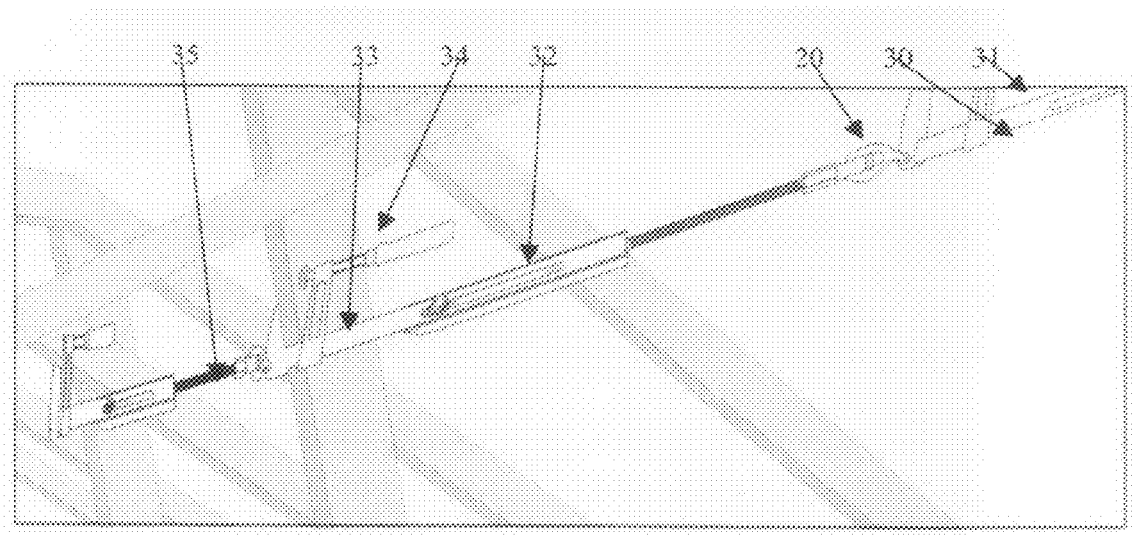
FIG. 9 illustrates the use of the clamping device on roof trusses.
Figure 10:
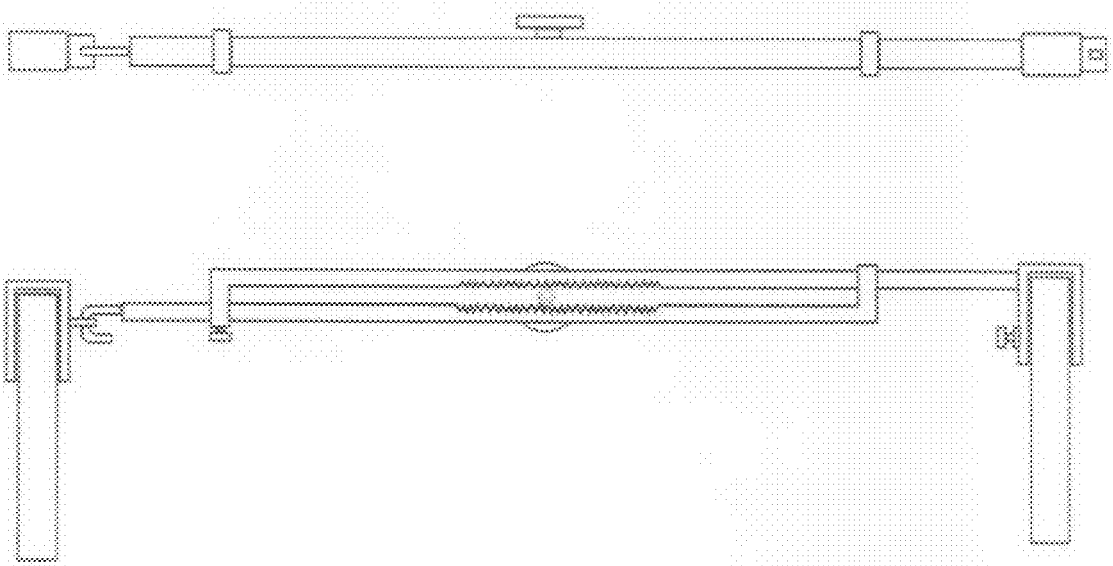
FIGS. 10-16 illustrate various other embodiments of the clamping device.
Figure 11:
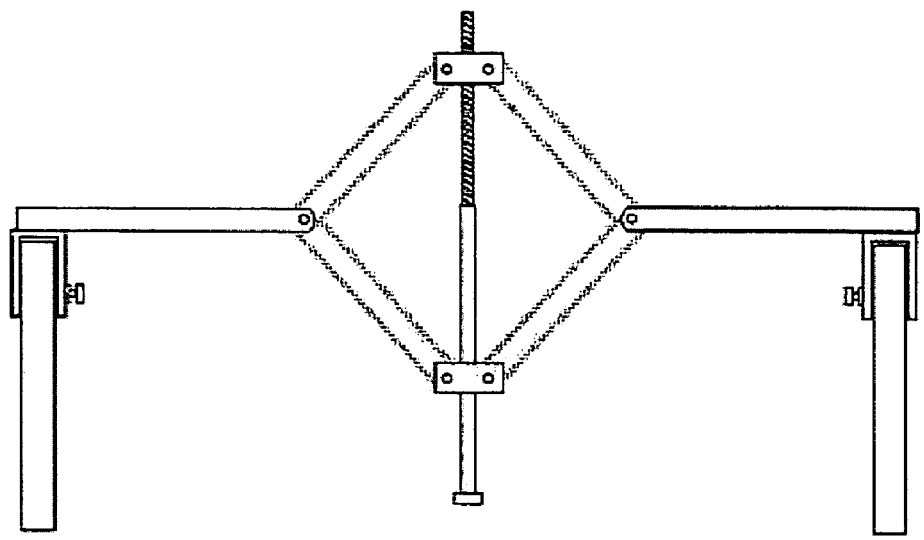
Figure 12:
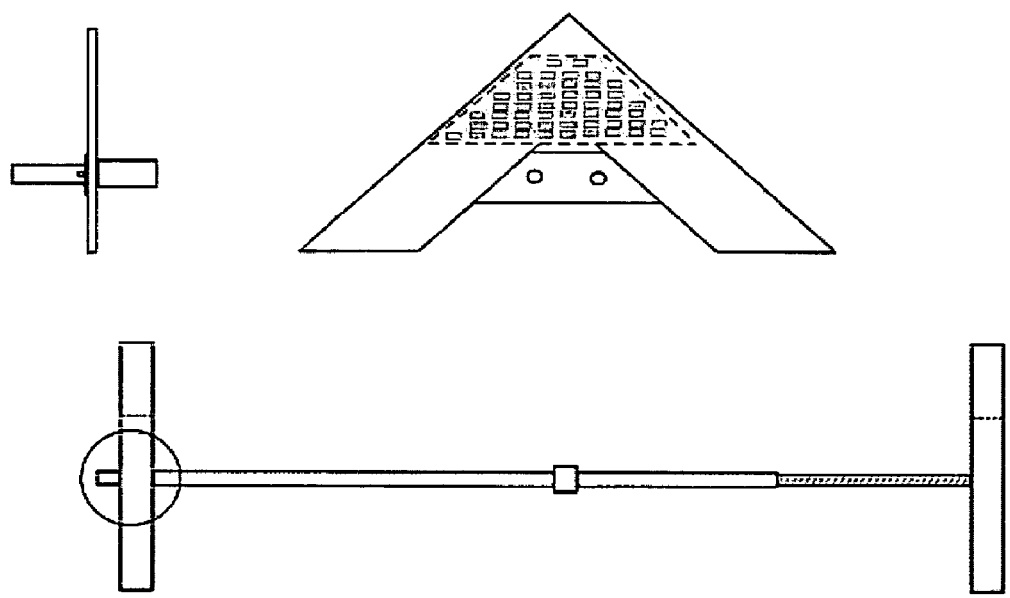
Figure 13:
Figure 14:
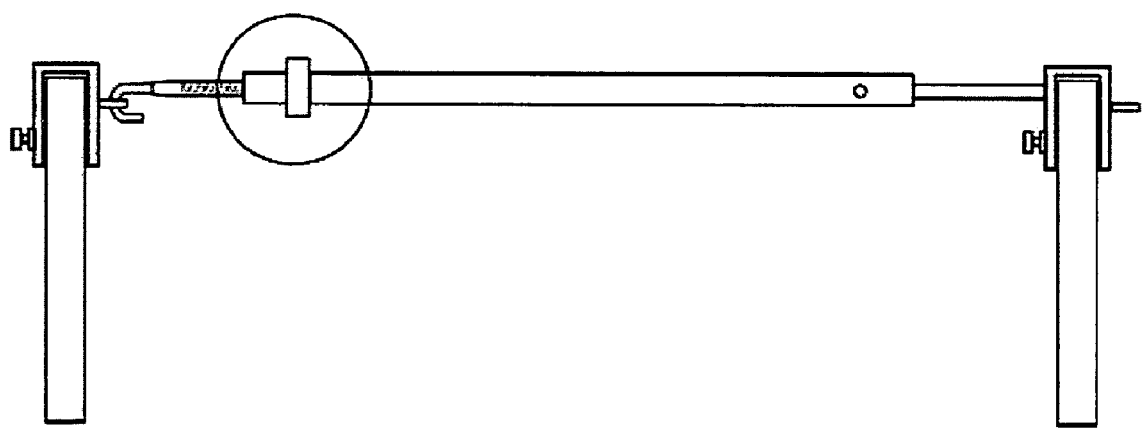
Figure 15:
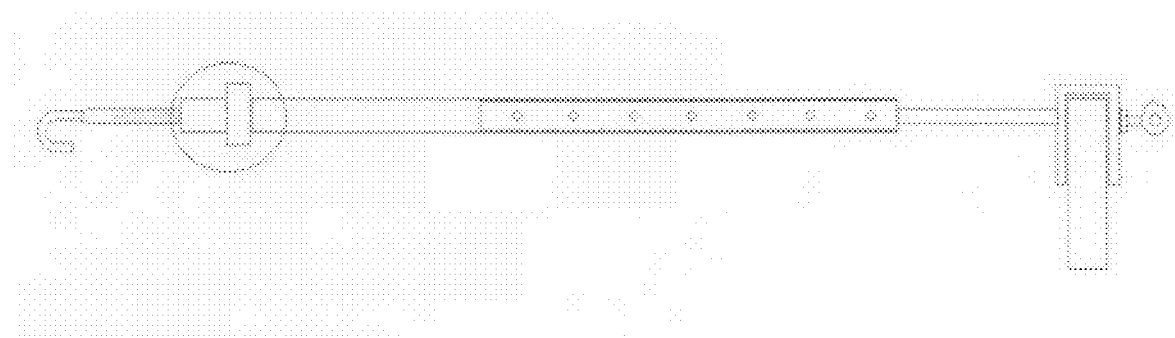
Figure 16:
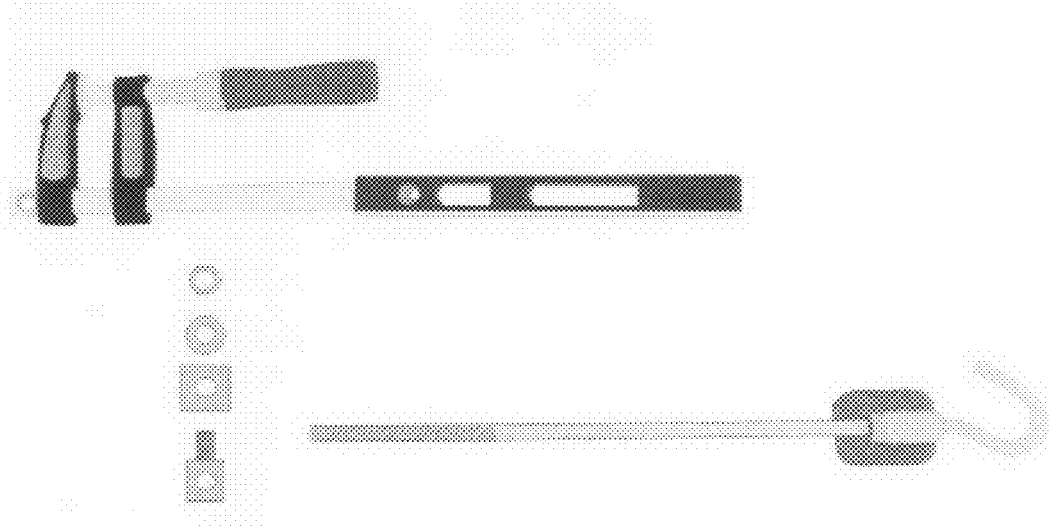

FIG. 9 shows how the clamp devices work in practice. Basically, a first clamping device 30 is attached to a first truss 31. The first clamping device 30 is provided with the small opening 19 in the stationary jaw member 16 (see FIG. 3 for instance). A second clamping device 32 is initially configured to the desired degree of length adjustment. Then, the hook 20 in the end of the second clamping device 32 passes through opening 19 in the first clamping device 30 to hook the second clamping device to the first clamping device. The position of the jaw members 33 on the second clamping device 32 are positioned exactly where the second truss 34 needs to be spaced. The second truss 34 can then be held in position and clamped by the jaw members 33 on the second clamping device 32. A third clamping device 35 is then hooked onto the second clamping device in the manner described above and the jaw members of the third clamping device are then positioned exactly where the third truss needs to be. This process of linking the clamping devices together can then be repeated until all the trusses are securely held in place.

The trusses can then be fixed using the roof battens and cross bracing after which the clamping devices can be removed.

The clamping devices can be reused many times and provides a safe and secure method to hold the trusses in place prior to attachment of the battens and cross braces. The clamping devices are length adjustable and therefore a tradesperson can initially adjust the length of each clamp to suit the truss basing and can then simply link the clamping devices together and clamp the jaws to the trusses. There is no need to provide a nail gun, or to individually hammer temporary wooden spacing members. There is very little likelihood that a clamping device will become inadvertently dislodged and cause the truss member to tip over. Once the various clamping devices have been adjusted in length, no more measurement needs to be taken to erect the trusses with the correct spacing between the trusses. The clamping devices are strong and robust and can be used over and over again. Once the trusses have been clamped in position, fine adjustment can be made by adjusting the threaded rod relative to the nut which is something not possible with the conventional technique of using wooden pieces. The clamping devices can be used for metal trusses without any modification which is something which is not possible with the conventional technique of using wooden pieces. The clamping devices do not split the timber which is something that can happen when nailing wooden pieces to the trusses. The clamping device allows the trusses to be positioned more quickly with less crane time and with less labour. The clamping device can be fitted to the top chord of the truss or the web of a truss. The diagonal bracing members can be fitted without needing to remove the clamping devices. The rods 27 can be interchanged for different truss spacings. The length of each clamping device can be easily adjusted in use by using a small spanner about the external nut 36 which is next to hook 20 (see FIG. 1).

Although the invention has been described with reference to the use of the clamping device with trusses, the clamping device can be used in a same way to hold the other members or pieces prior to fixing the members or pieces. For instance, the clamping devices can be used when standing SHS columns in patios or for bracing half height wall frames where adjustment is necessary to plumb the columns or the walls.

FIGS. 10-15 illustrate other embodiments of the invention, including a rack and pinion type adjustment (FIG. 10), a threaded vertical type adjustment (FIG. 11), a horizontal "handed" threading arrangement (FIG. 12), a simple threaded rod (FIG. 13), a "threading" type clamping arrangement (FIG. 14), and a threadingly adjustable tube (FIG. 15), all of which illustrate the breadth and scope of the invention.

Throughout the specification and the claims (if present), unless the context requires otherwise, the term "comprise", or variations such as "comprises" or "comprising", will be understood to apply the inclusion of the stated integer or group of integers but not the exclusion of any other integer or group of integers.

Throughout the specification and claims (if present), unless the context requires otherwise, the term "substantially" or "about" will be understood to not be limited to the value for the range qualified by the terms.

It should be appreciated that various other changes and modifications can be made to any embodiment described without departing from the spirit and scope of the invention.

The invention claimed is:

1. A clamping device particularly for use in the preliminary stages of the erection of roof trusses of a building, the clamping device comprising
    a clamping means to enable the device to be securely and releasably attached to a first truss and which includes an opening,
    a hook attachment means rotatable relative to the clamping means, and
    means to vary the length between the clamping means and the hook attachment means,
    wherein the opening and the hook attachment means enables said clamping device to be attached to an adjacent second clamping device having the same said clamping means, said opening, said hook attachment means, and said means to vary the length.

2. The device as claimed in claim 1, wherein the clamping means comprises jaw members that can attach to a truss.

3. The device as claimed in claim 1, wherein, in use, a hook of the hook attachment means attaches to the adjacent second clamping device.

4. The device as claimed in claim 1, wherein the clamping device and the adjacent second clamping device are attachable to one another in a substantially linear manner.

5. The device according to claim 1, wherein the means to vary the length between the clamping means and the hook attachment means includes a threaded length adjustable mechanism.

6. The device according to claim 5, wherein the threaded length adjustable mechanism includes a first portion associated with the clamping means and a second portion associated with the hook attachment means, the first and second portions adapted to at least partially overlap each other longitudinally to adjust the effective length separating the clamping means and the hook attachment means.

7. A method of holding roof trusses in position, the method comprising
using the clamping device according to claim 1,
positioning the clamping means of the clamping device onto a first truss,
positioning the adjacent second clamping device according to claim 1 such that the clamping means of the adjacent second clamping device is attached to a second truss, and the hook attachment means of the adjacent second clamping device is attached to the opening of the clamping device.

8. A method of holding roof trusses in position according to claim 7, wherein the hook attachment means of the adjacent second clamping device is attached to the first opening of the clamping device.

* * * * *